United States Patent

[11] 3,582,933

[72] Inventor William Fouse W. Caldwell
 12... ...Palan
[21] Appl. No. 76... ...Carothers
[22] Filed Oct. 3, 1968
[45] Patented June 1, 1971

[54] PROXIMITY DETECTOR
9 Claims, 8 Drawing Figs.

[52] U.S. Cl. .................................................. 340/258,
 340/104, 307/290, 307/310, 315/83, 315/134,
 250/206
[51] Int. Cl. .................................................. B60g 1/50
[50] Field of Search .................................. 340/258,
 258 B, 33, 61, 104; 246/167, 167 D; 250/206, 214,
 215; 315/83, 134, 135, 136; 307/310, 311, 290,
 289

[56] References Cited
UNITED STATES PATENTS

| | | | |
|---|---|---|---|
| 2,708,715 | 5/1955 | Meyers | 340/258X |
| 2,757,286 | 7/1956 | Wanlass | 307/290 |
| 3,118,601 | 1/1964 | Robb, Jr. | 307/310X |
| 3,138,357 | 6/1964 | Whitwell et al. | 340/258BUX |
| 3,146,374 | 8/1964 | Kikuyama | 315/83 |
| 3,152,317 | 10/1964 | Mayer | 340/104X |
| 3,220,005 | 11/1965 | Benoit | 250/215X |
| 3,345,536 | 10/1967 | Atkins et al. | 315/83 |
| 3,449,599 | 6/1969 | Henry | 307/310 |
| 3,460,000 | 8/1969 | Kiffmeyer | 307/290X |

ABSTRACT: The fail-safe radiation detector of this invention senses the proximity between bodies movable relative to each other whether on the same way, track or crossing, that would lead to collision if not stopped in time. The sensing detector of each mobile body is angularly adjustable having a prescribed field of view effective within a preselected safe distance measured by the distance represented by the natural tangent function of the preselected angle of adjustment as the distance for alarm and arrest of the mobile body through a sensor normally exposed to a pulsating source of radiation. This can be a semiconductor, a tungsten filament lamp or a glowlamp. It may be referred to as the lamp or light or a radiant energy, whether it be microwave, heat or visible light will be called light. The radiant energy partly reduces the resistance of the sensor placing a more positive voltage on a transistor circuit and maintains the radiant energy pulsating and retains an open alarm circuit until the sensor is subjected to a radiant source of energy from the adjacent body which materially reduces the sensor resistance and floods the transistor circuit with greater operating energy shutting off the pulsating radiant energy and releasing the alarm relay causing it to sound an alarm and stop the mobile body before collision. Different novel circuit arrangements are employed to maintain the alarm relay energized as it only operates the alarm when the power fails or it is dropped out due to the sensor receiving the necessary radiant energy to materially change its resistance. This novel circuit also provides different modes of pulsating the pilot lamp or other source of radiant energy, which is important to this invention.

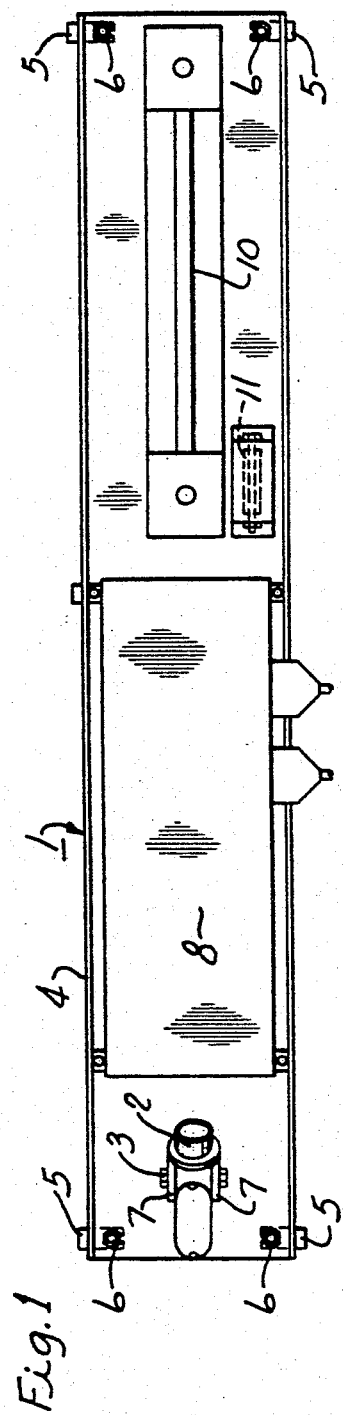
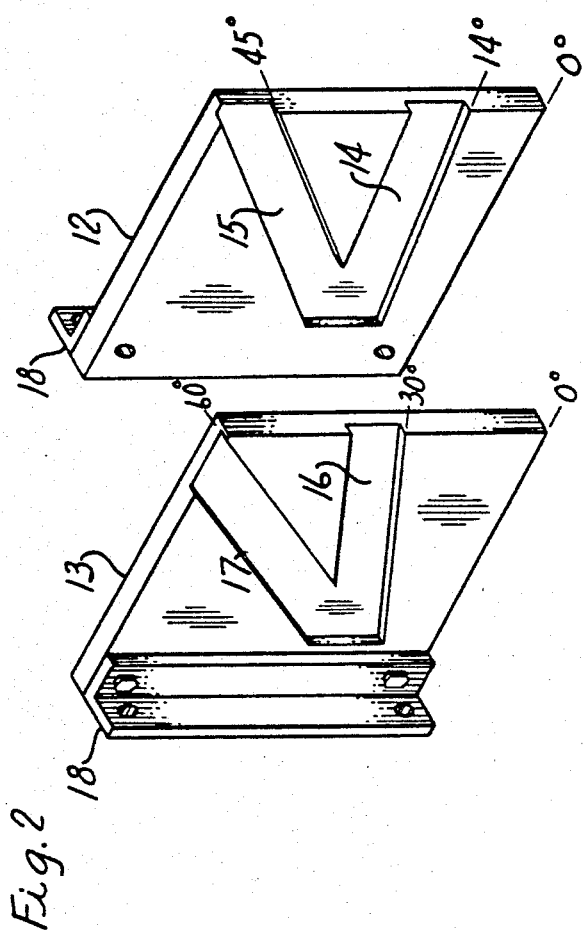
INVENTOR.
WILLARD PORTER PLACE
BY
CAROTHERS & CAROTHERS
HIS ATTORNEYS

INVENTOR.
WILLARD PORTER PLACE
BY
CAROTHERS & CAROTHERS
HIS ATTORNEYS 3,582,933

1

PROXIMITY DETECTOR

BACKGROUND OF THE INVENTION

This invention is an improvement over my application Ser. No. 688,230, filed Dec. 5, 1967 and U.S. Pat. No. 2,814,032, of Nov. 19, 1957, filed in Class 340, Subclass 258, all of which disclose protective apparatus for preventing collision of a pair of mobile bodies apt to collide due to their proximity or between one mobile body and the ends of the track or way on which it runs. Such mobile devices may be dock cranes that travel on the same track when loading and unloading bulk freight such as ore or coal, or bridge cranes on the same track in the same bay, or even crane carriages operating on the same bridge and movable relative to each other and to the ends of the bridge. Each mobile unit must be protected by signals as well as safety stops to avoid wrecking the crane equipment as well as the building.

SUMMARY OF THE INVENTION

The principal object of this invention is the natural tangent function of the angular position of the sensing device measures the distance between bodies at which time the sensor alarm will sound and stop the moving body.

Another important object is the provision of an electronic circuit including two sensing units connected in series between positive voltage and ground to provide a lower positive voltage at their juncture with one sensor covered and the other subjected to a lens collecting radiation owing to its angular position to saturate the exposed sensor if a radiation device comes in its angular view. However, both sensors are affected by the ambient temperature so two are selected and only one is exposed to the radiant energy which balance by ambient temperature is also carried out in the first stages of the transistor circuitry wherein the transistors balance each against the other so that the sensitivity remains constant over a wide range of temperature which is an important object of this invention.

Another important object of this invention is the provision of an electronic circuit initiated by a sensor exposed to a controlled radiant oscillation such as from a pulsating or flashing light or other source of pulsating radiant energy, to maintain a signal relay energized but if flooded by a radiation indicating the proximity of the closeness of an adjacent object, will drop out the signal relay to sound an alarm and stop the moving body. This electronic circuit has several distinct parts some of which may be eliminated or substituted.

Other objects and advantages appear hereinafter in the following description and claims.

The accompanying drawings show, for the purpose of exemplification without limiting the invention or the claims thereto, certain practical embodiments illustrating the principles of this invention wherein:

FIG. 1 is a view in front elevation of the sensor detector comprising this invention.

FIG. 2 is a modified form of angular mounting for the sensor detector.

2

Figure 8:
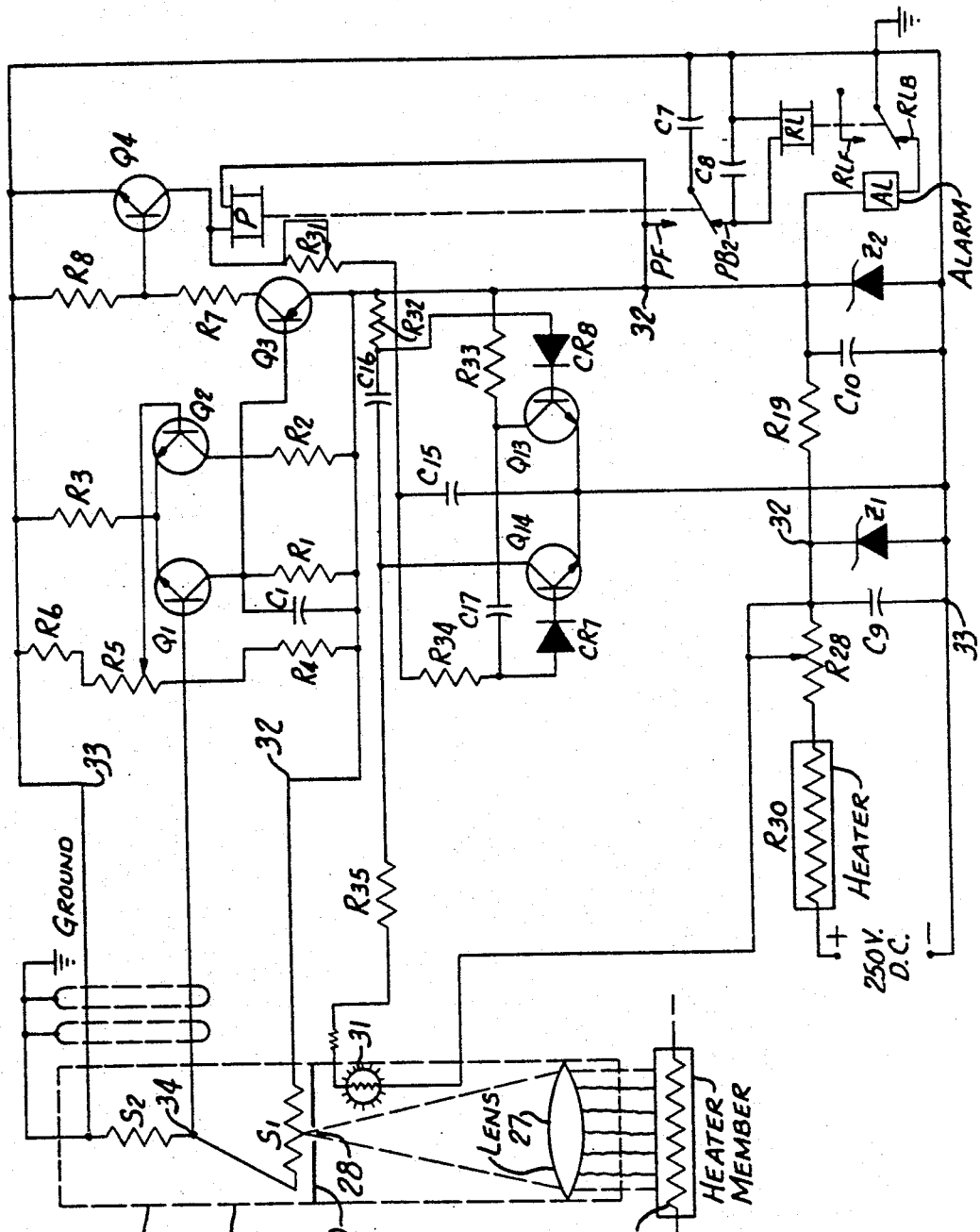

FIG. 8 is a circuit diagram showing a multiple vibrator providing radiant energy pulses effective on the sensor together with a pulse relay retaining an alarm relay energized as a fail-safe radiation detector.

Referring to FIG. 1, the fail-safe radiation detector 1 includes a sensing head 2 pivotally but with provision to securely fix the angle once selected, mounted as at 3 to the base member 4 which has the feet members 5 that may be welded to the body or bridge section of a crane or other body to be protected, the opposite ends of the lugs 5 are arranged to be adjustable secured to the frame 1 by means of the bolts 6. The frame 1 is preferable of channel form and supports the bracket member 7 that carries the pivotal member 3 supporting the sensor head 2 and adjacent thereto is a box or housing 8 which contains the electrical circuit components and at the far end of the base member 4 is secured a radiant member 10 that is an enclosed heating element of a character found on an ordinary electric stove. An adjustable resistor 11 is secured to the base 4 below the radiating element 10 which is connected in series with the radiating element 10, one end of which is connected to the positive side of the 240 volt DC service generator or a rectified alternating current source.

Since the sensing head 2 is pivotally supported as indicated at 3 it may be positioned in any angular degree in either direction from a normal position relative to the base 4 and extend through 90° in either direction.

As shown in FIG. 2, rather than provide a variable mounting for the sensing head 2 that may be adjusted in any specific angular degree by a pair of plates 12 and 13 are respectively provided with slots 14 and 15 in the plate 12 and 16 and 17 in the plate 13. The slots 14 and 17 represent respectively angular positions of 14° and 45° in plate 12 and 30° and 60° in plate 13. The mounting blocks 18 may be mounted on either of the plates 12 and 13. The back of plate 13 is employed in combination with the face of the plate 12 for determining the angular position of the slots 14 and 15, or the face of the plate 13 is employed with the back of the plate 12 when it is desired to employ the angular slots 16 and 17 in the plate 3. When these mounting blocks are supported on the base member as shown in FIG. 1 so that the plane of each of the blocks 12 and 13 are substantially horizontal, the slots in the respective plates will position the mounting head 2 at the selected angle of 14°, 45°, 30° and 60° relative to a plane normal to the crane. Obviously any other selected degree may be employed or combinations which are found to be more suitable for the particular installation. In place of slots, dowel pins fixing the position of the sensor housing may be employed.

Figure 3:
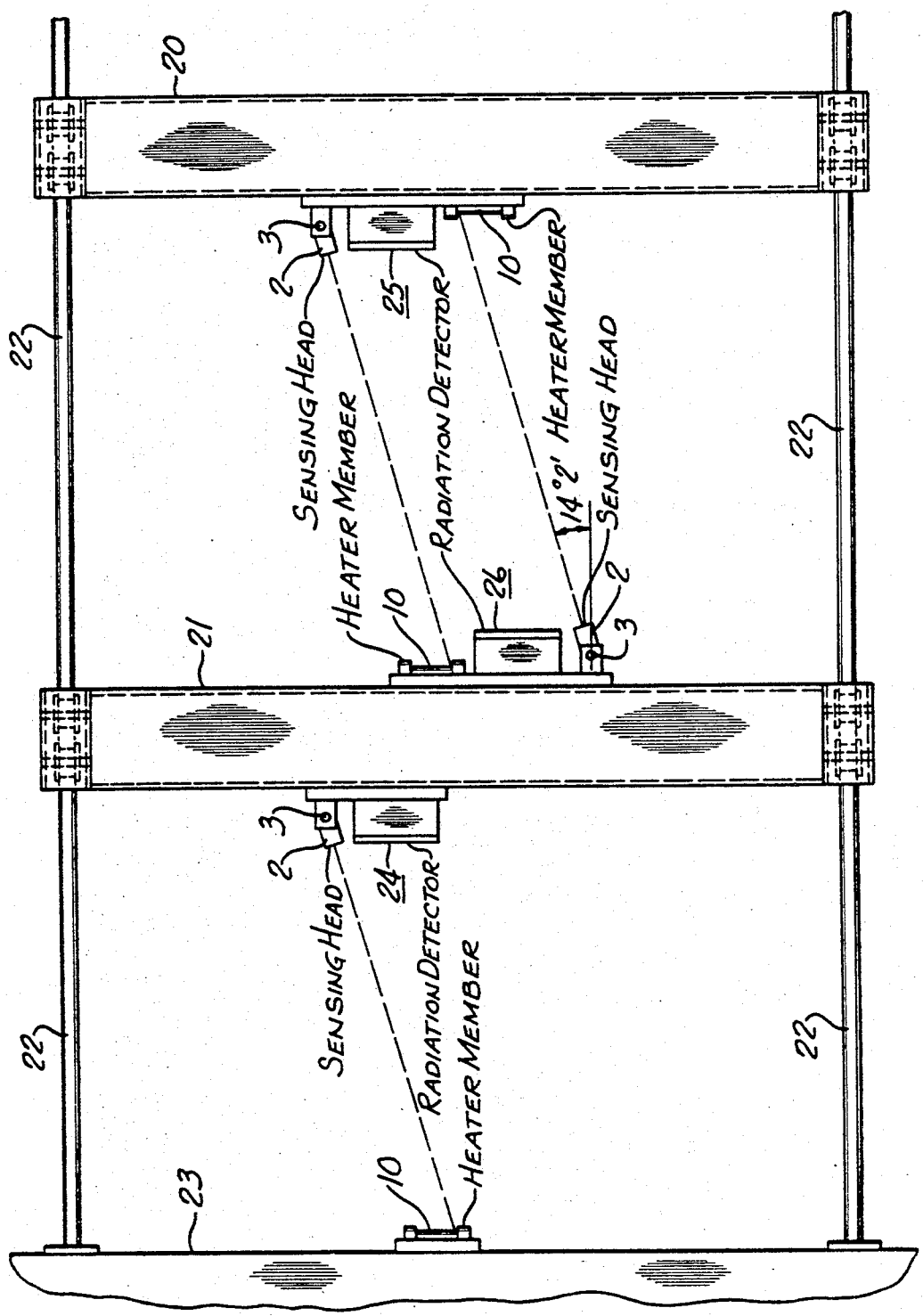
FIG. 3 is a plan view of the sensor detectors on adjacent cranes working on a single track.

As shown in FIG. 3, when the two crane bridge members 20 and 21 are supported from the track 22 which crane bridges may have their respective carriages movable longitudinally of each bridge and in case of two carriages one can provide a detecting device of this character on each carriage to prevent their proximity from becoming close to collision.

The wall 23 is provided with a heater element 10 that cooperates with the radiation detector member 24 mounted on the adjacent face of the bridge crane 21. Each of the bridge cranes 20 and 21 are provided with their respective radiation detectors 25 and 26, each of which is provided with the elements as shown and described in conjunction with FIG. 1.

Considering the angle of the sensor head to be approximately 14° and 2° from a plane normal to the base upon which the detector is mounted. The normal tangent of such angle would be 0.24995 or substantially 0.25 being ¼ or a ratio of 1 to 4 for every foot of displacement along the bridge crane, the sensing head 2 positioned at 14° 2' would provide a separating distance of 4 feet. Thus, with this angle a displacement of 2 feet would provide a separation or function of the tangent to be 8 feet.

It may of course be desirable to have one crane member sound the signal before the other, in which case the separation would create the alarm at a greater distance between the two cranes. Thus, with a proper selection of the angular degree of the sensor head one can determine any specific distance which will register the radiant energy from the opposing hot element 10 to the end of the sensing head. Thus a very accurate control can be made as to when the radiant energy from the heated element will be effective on the sensing head.

Thus the proximity detector is designed primarily to indicate when two vehicles on the same track approach one another within a distance that would be considered dangerous to both the equipment, the operator and the loads which they are manipulating. This occurs when both operators are warned by a horn and if desired the power can be removed and the brakes set to prevent a collision since several cranes may be working in one bay along one track and it is always necessary to have this distance measured immediately to a fair degree of accuracy so that the cranes can be operated as closely as possible without coming into engagement with each other.

Another possible use of this radiation detector in a modified form is to assist in future automation by stopping the bridge as well as the carriage or trolley of the crane in any number of preset positions by placing along the track a radiant element which may be controlled by preselected energization so that the crane may be automatically and readily controlled to pick up or deposit its load at a specific position along the track. Thus the same control may be positioned on the carriage as well as the crane making the same fully automatic in accordance with a preselected schedule. This results in a fully automatic crane operation.

The sensing detector is the preferred form to prevent collision between crane carriages or between cranes or between cranes and their adjacent walls at the end of the track as indicated in FIG. 3.

Figure 4:
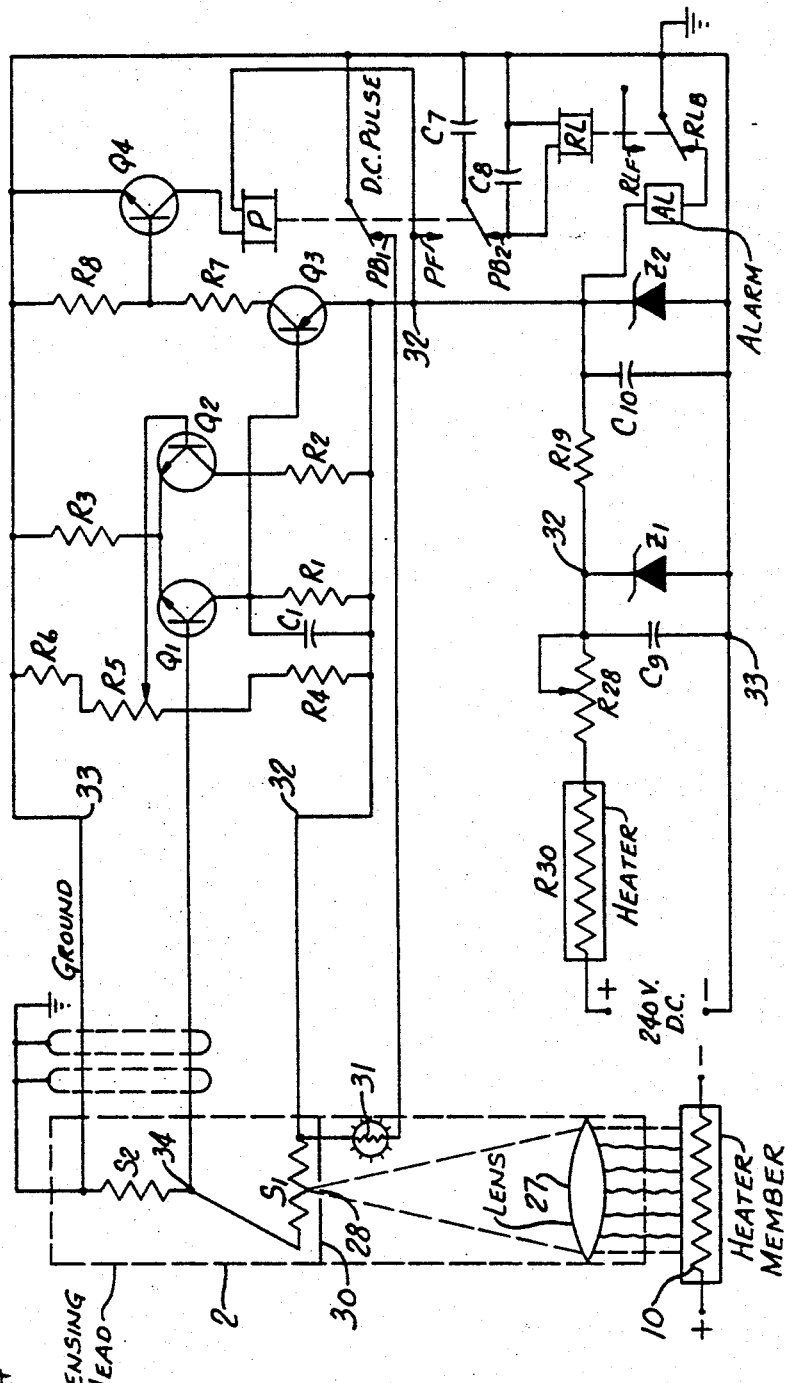
FIG. 4 is a circuit diagram showing a pulse relay providing the radiant energy pulses effective on the sensor and retaining an alarm relay energized a fail-safe radiation detector.

Referring to FIG. 4, it will be shown that the sensing head 2 contains a lens 27 which collects the radiating waves from the horizontally disposed heater or radiant member 10 and the lens is positioned to focus the radiant energy that passes thereinto through the vertically disposed slotted opening 28 in the partition 30 so that the radiant energy is effective against the vertically disposed sensor S1. The lamp bulb and resistor 31 is also within the chamber of the sensor head 2 and it is required to supply a pulsating radiant energy to the sensor S1 so as to partially energize the same. The sensor S1 is connected in series with the sensor S2 and between the positive voltage source such as indicated on the line 32 to a negative or ground connection as indicated at 33 and a juncture 34 therebetween.

Thus the sensing head 2 contains a lens and the sensing element S1 to detect infrared. Infrared is preferred because it is not obscured as much as visible light by dust and fog, and also because a radiator can be a simple resistor that has a much longer life than most lamps, and is cheaper than a microwave source. Moreover, the sensing head can be made with a simple optical system and its field of view can be large or small as required. As indicated in FIG. 3, the two cranes are in position where their respective sensing heads can see each other and if they were separated by a greater distance the sensor heads would see only the crane bridge but not the infrared radiant energy. If the cranes were separated by a greater distance their sensor heads would see only the crane bridge and still at a greater distance the crane runway and there would be nothing ordinarily along the path of the runway which would in any way involve or radiate energy to the sensor head. If the cranes approached each other more closely they still would see each other until the respective heating elements again pass out of view. However, before this time the signal would have been sounded and the operating power to the crane would have been cut off.

Thus the distance that is determined by the offset between the units with respect to each other is due to the angle of the sensing head and does not depend on the strength of the signal or the sensitivity of the receiver except that the same be sufficient.

The device is to provide safety and must therefore itself be fail-safe as far as possible. In the circuitry as shown in FIG. 4 there are two sensing elements S1 and S2, with only S1 exposed to the infrared radiation admitted and focused by the lens in the housing. When exposed by the flashing light 31 the sensing head S1 lowers its resistance somewhat and the base Q1 becomes more positive so that it will conduct. The voltage divider R5 applies voltage to Q2 base which has its emitter connected to the emitter of Q1 and both of which are connected to one end of R3 the other end of which is connected to ground. Thus Q2 presets the bias voltage on Q1 and determines the point at which Q1 begins to conduct. Since both these sensors S1 and S2 are affected by the ambient temperature but only one is exposed to radiant energy and also the transistors Q1 and Q2 are subjected to the same relevant ambient temperature the circuitry balances each against the other so that the sensitivity remains constant over a wide range of temperature.

It will be noted that the Q1 and Q2 are both NPN transistors whereas Q3 is a PNP transistor and Q4, on the other hand, is an NPN. When Q1 conducts its current is amplified by Q3 and the collector current of Q3 travels through resistor R7 to the base of Q4, resistor R7 being connected in turn to resistor R8 and ground. The emitter of Q4 is also connected to ground. However, the collector of Q4 is connected to one side of the pulsing relay P the other side of which is connected to a voltage source. As shown, a positive voltage is connected to the emitter of Q3 and the positive voltage travels respectively between the resistors R1 and R2 to their collectors of Q1 and Q2 and the condenser C1 is connected in parallel with R1. The voltage divider is made up of R4, R5 and R6, being a variable resistor and R4 and R6 being within the confines of the circuitry of Q1 and Q2 so that this resistance is also affected by the same ambient temperature of these transistors. The variable resistor R5 of the voltage divider circuit is not on the card containing the resistors and the transistors Q1, Q2, Q3 and Q4. This card circuit is readily changed by plug in terminals.

Upon the excitation of Q4 by the pulses of light from the pulsating radiating signal means or lamp 31, the contacts pulsing relay P1 will raise and lower depending upon the frequency of the conduction of current by the transistor Q4. Thus one side of the lamp 31 may be connected to 32, the positive line of this transistor circuit, and the other side may be connected to the back contact PB1 of the pulsing relay P and thence through the heel to ground would provide a positive application of voltage to the light 31 every time the pulsating relay P is deenergized and closes the back contact PB1.

However, as shown in FIG. 8, the collector of Q4 is connected to the potentiometer R31 the other end of which is connected through resistor R34 and CR7 to the base of Q14 the emitter of which is connected to the emitter of Q13 and both are connected to ground. C15 is connected from ground to between R31 and R34. The base of Q13 is connected through inverted CR8 and through R32 to positive voltage. The collector of Q13 is connected through R33 to positive voltage. The collector of Q14 is connected through R35 to one side of the pulsating radiator or lamp 31 the side of which is connected to positive voltage. The respective collectors of Q13 and Q14 are connected through their respective condensers C17 and C16 and through CR7 and CR8 to the respective bases of Q14 and Q15 to complete this multiple vibrator circuit that pulsates the source of the radiant energy 31.

The pulsing relay P also has a second back contact PB2 and a front contact PF the latter being connected to the positive line 32. The back contact PB2 is connected to one side of the operating coil of the relay RL which controls the alarm circuit and the other end of which is connected to ground. A condenser C8 is connected in parallel with the relay RL. To complete this circuit a condenser C7 is connected between ground and the heel of the contacts PF and PB2. Thus every time the pulsing relay P is energized the contact PF connects positive voltage to the condenser C7 the other side of which is connected to ground. This charges the condenser C7 and when the pulsating relay P drops from the front contact and closes its back contact PB2 the charge on condenser C7 is sufficient to energize the relay RL and close its front contact PF. Since the relay RL has a condenser C8 connected in parallel therewith, this provides a delay in opening for the relay RL and the relay RL will remain up until after the pulsating relay P will again be energized to connect the PF front contact to again charge the condenser C7 and before the condenser C8 has an opportunity to completely discharge and release the relay RL the latter is again charged by the condenser C7 through the back contact PB2. This is shown in both FIG. 4 and FIG. 8.

Thus the RL relay will maintain energized as long as the pulsating relay P continues to oscillate. This will retain the back contact of the RL relay open and thus current will be unable to flow from the positive voltage through the alarm AL to ground and no signal will occur. The RLF or front contact to the RL relay would normally complete a circuit for operating the crane on which this device is mounted for protection and if the RL relay ever drops the alarm AL is sounded and the current for the operation of the crane is stopped by opening the RLF contact which is true for FIGS. 4 and 8.

The source of voltages shown to be 240 volts DC and is connected directly to the heater R30 which represents the heater in conjunction with the circuit as shown. AC could be used if rectified. The heater 10 being a heater of another member or mounted on the wall. The opposite end of the heater R30 is connected to the variable resistance R28 to determine the voltage on the heater. Adequate protection is obtained by the Zener Z1 and a condenser C9 is connected from the positive voltage line 32 to ground to regulate the voltage on line 32. R19 is connected in line 32 before condenser C10 which is connected in parallel with the Zener Z2 and the other ends are connected to ground. This completes the circuit of FIGS. 4 and 8.

Figure 5:
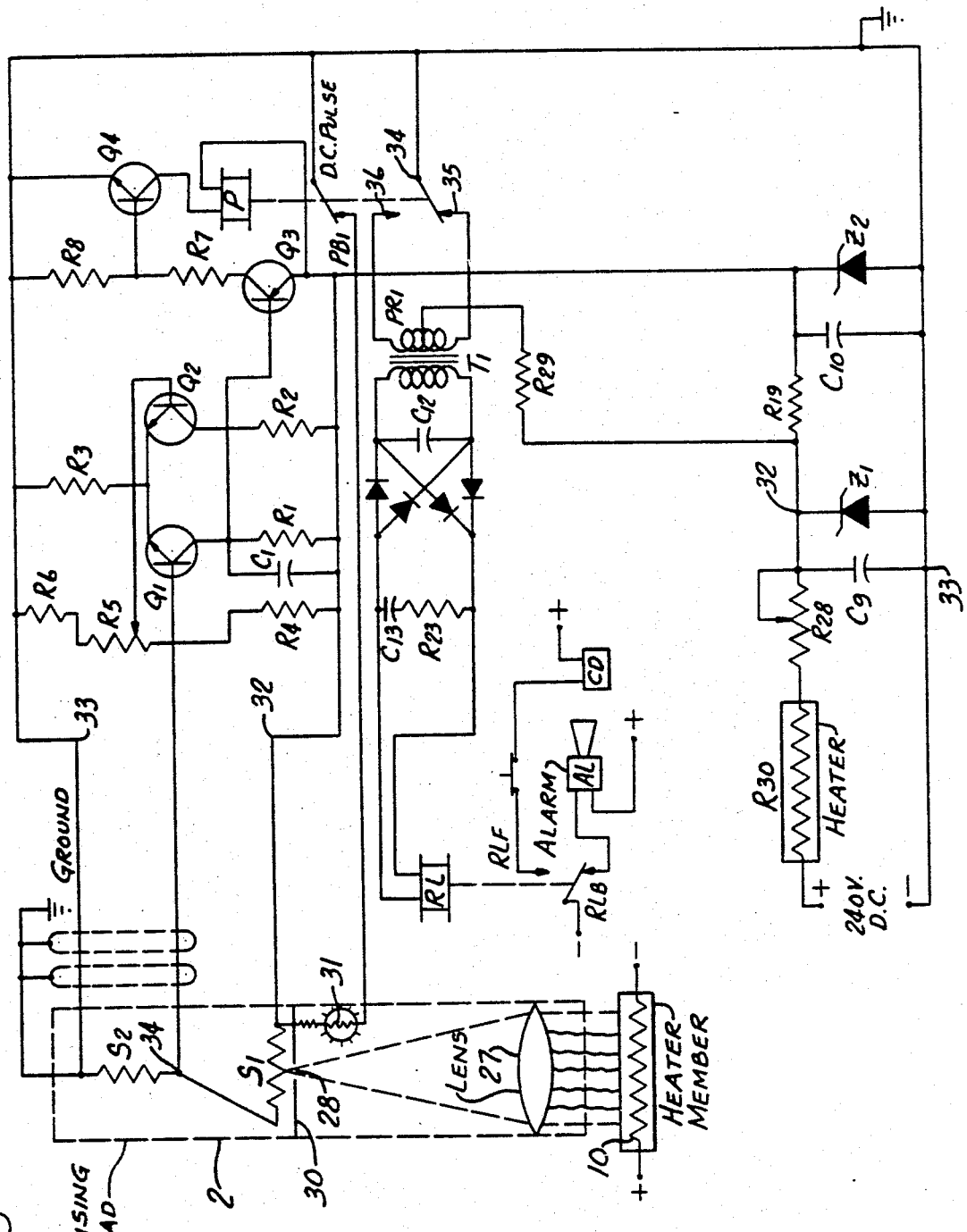
FIG. 5 is a circuit diagram showing a pulse relay providing the radiant energy pulses effective on the sensor and energizing an alarm relay through a center tap primary of a relay control transformer of a fail-safe radiation detector.

The initial circuit of FIG. 5 is similar to that of FIGS. 4 and 8, however, the pulsing relay P functions with its heel contact 34 supplying negative connection to the opposite sides of the primary transformer T1 the back contact being connected as indicated at 35 and the front contact being indicated at 36. The primary of the T1 transformer has a mid tap connection to the positive voltage line 32 as shown through resistor R29. Thus the pulsating relay P operating contact 34 provides alternate negative connection to opposite ends of the primary of the transformer T1 supplying alternate pulsating type of current that is effective as an alternating current in the transformer secondary which is converted into direct current by the full wave bridge type rectifier supplying the relay RL. A condenser C12 is connected across secondary for transient currents and a resistance R23 is connected in series with the condenser C13 across the operating coil of RL in order to restrict excessive current flow. The front contact RLF of relay RL is arranged to close the circuit when energized for operating the crane or other device designated CD. On the other hand, the back contact RLB will close and operate the signal AL when the RL relay is deenergized which is a fail-safe condition. In this circuit the pulsing relay P is made to provide an alternating type of current by merely engaging and disengaging the opposite sides of the primary transformer T1 to supply a simulated alternating current thereto.

Figure 6:
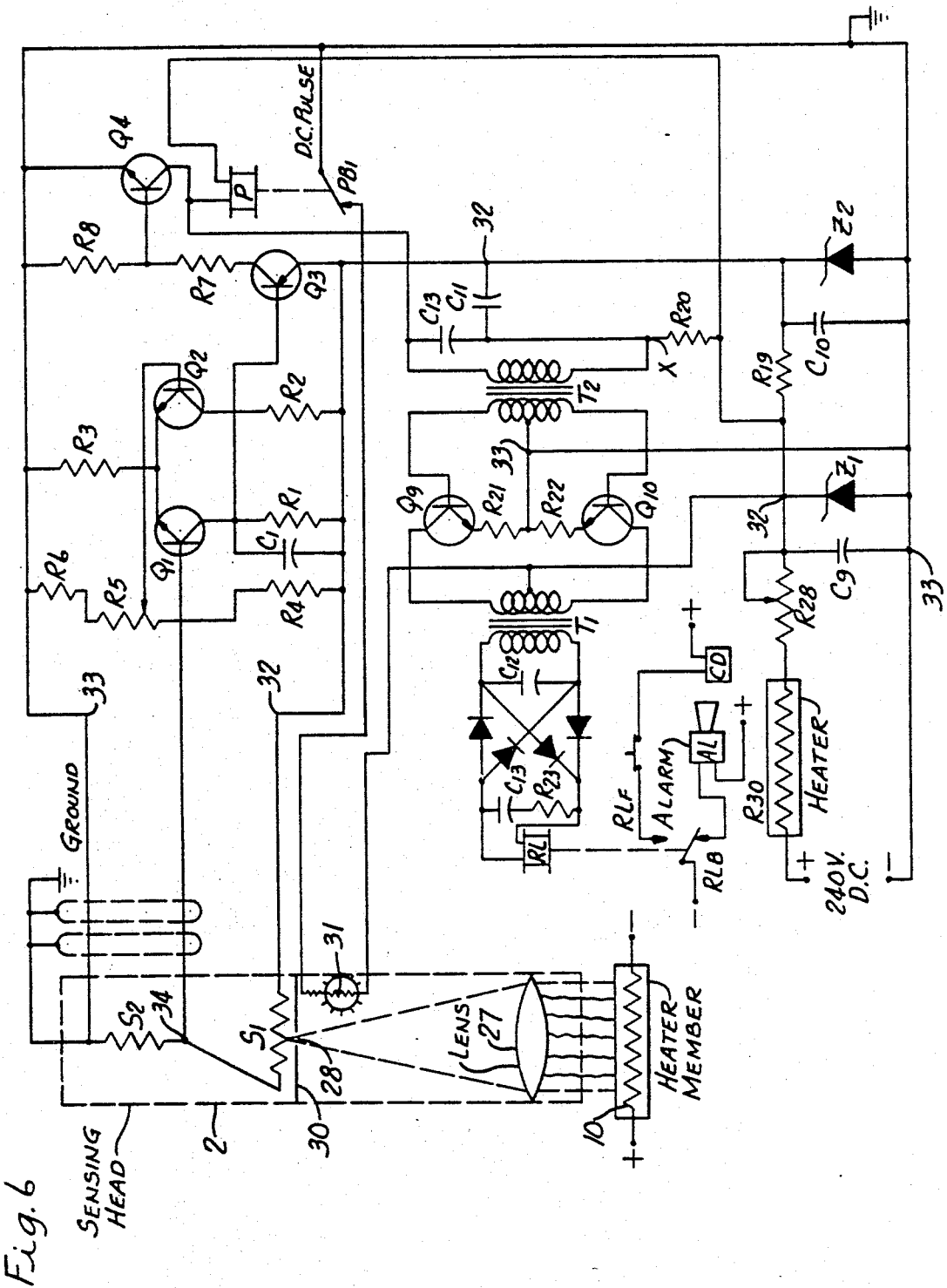
FIG. 6 is a circuit diagram showing a pulse relay providing the radiant energy pulses effective on a sensor and energizing an alarm relay through a center tap primary transformer energized by controlled alternately energized transistors of fail-safe radiation detector.

Referring to FIG. 6, the pulsing relay P is actuated in the same manner for providing a pulsating light 31 which supplies sufficient energy to energize Q4 and operate the pulsing relay P. However, in this circuit Q4 is sufficiently endowed with power to also supply one side of the transformer primary T2 with a pulsating current the other side being connected at point X to one side of the resistor R20 the other side of which is connected to the positive volt line 32 between R19 and R28 and a condenser C11 is connected to line 32 on the other side of the resistor R19 and a condenser C13 is connected in parallel with the primary of the T2 primary.

Each side of the secondary of the transformer T2 is connected to a respective base of the transistors Q9 and 10, their collectors of which are connected directly to the opposite ends of the primary of the transformer T1 the center tap of which is connected to the positive volt line 32. Each of the transistors Q9 and Q10 have their emitters respectively connected through their resistors R21 and R22 to ground which connection is also made to the mid tap of the secondary T2. In this circuit a pulsating current is supplied to the primary of transformer T2 which is induced by its secondary to actuate alternately the transistors Q9 and Q10 to supply a pulsating current in each half of the primary of transformer T1 that is again induced by its secondary to energize the alarm relay RL to maintain energization of the same and maintain a circuit through its front contact RLF to maintain operation of the crane CD.

Figure 7:
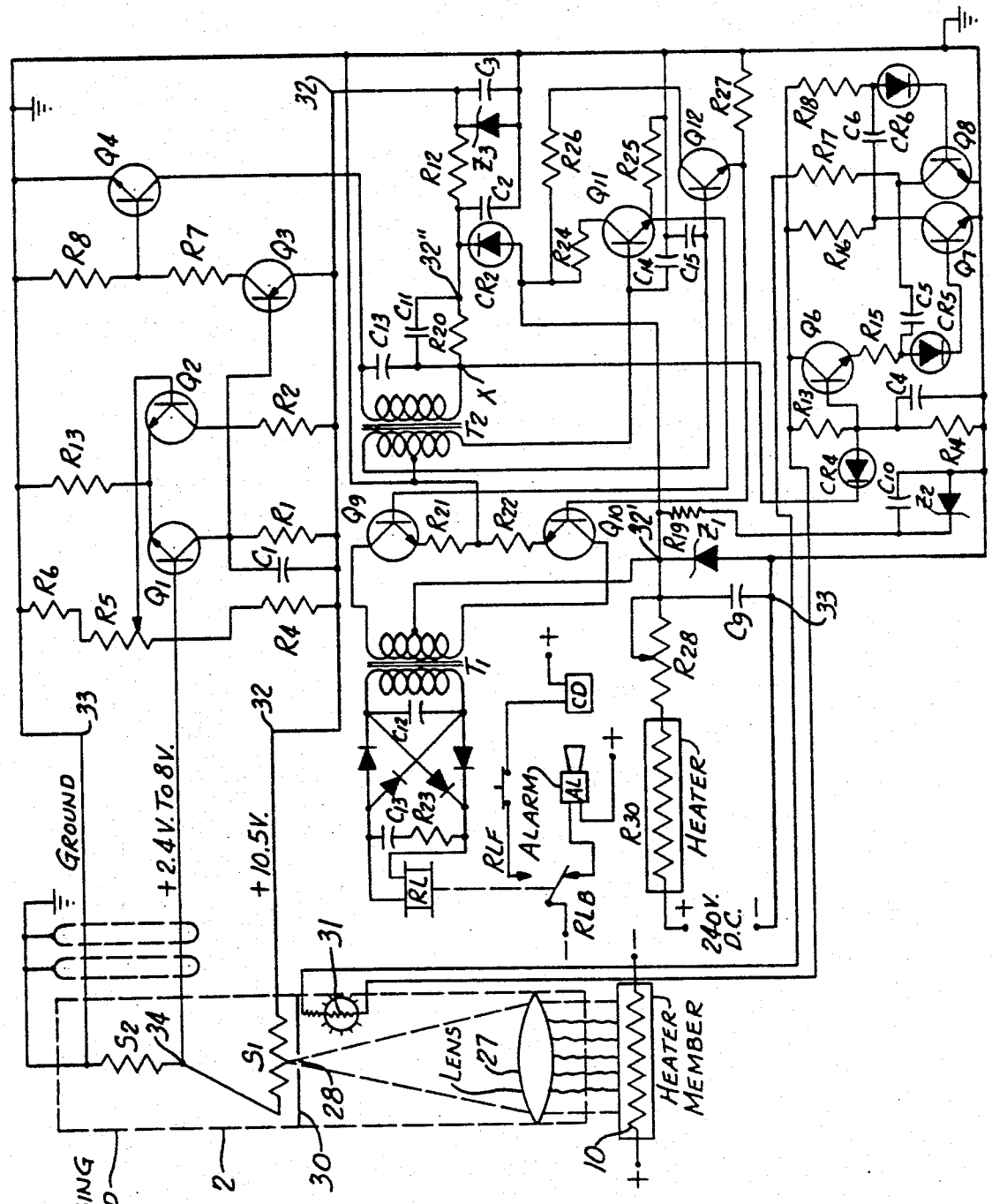
FIG. 7 is a circuit diagram showing an initial signal amplifier, a power supply and amplifier and an electronic driver for producing infrared pulses effective on a sensor and energizing an alarm relay of a fail-safe radiation detector.

Referring now to FIG. 7, the circuit is similar to that shown in FIG. 6 with the exception that an additional power supply plug-in card circuit has been shown in combination with an additional amplifier plug-in card circuit and a lamp driver plug-in card circuit, all (plug-in cards) of which are readily replaceable. The pulsating relay P has been eliminated and the output of Q4 through its collector is connected directly to one side of the primary of transformer T2 the opposite side of which is connected to X and to the input of the lamp driver circuit.

The power supply plug-in card circuit is provided with a diode CR2 connected in between the power supply 32' and the voltage supply side of the resistance R20 indicated at 32''. An additional resistance R12 is connected between 32'' and line 32. Thus if 20 volts is supplied to the power line 32' it is approximately the same in line 32''. However, this voltage would be approximately 10.5 as shown in the line 32. Condensers C2 and C3 are connected from opposite ends of R12 to ground and Zener Z3 is connected in parallel with C3.

The output of the secondary transformer T2 is connected to the respective bases of the transistors Q11 and Q12 on the plug-in amplifying card which amplify this output and supply respectively the bases of the transistors Q9 and Q10, the collectors of which energize the primary transformer T1 for controlling the operation of the RL relay as previously described. The mid tap of the secondary of the transformer T2 is connected midway between the resistors R21 and R22 the other sides of which are respectively connected to the emitters of the transistors Q9 and Q10. This mid tap connection is also connected to ground as shown. The mid tap of the primary of transformer T1 is connected to positive voltage connection 32'. The respective collectors of Q11 and Q12 are connected through their respective resistances to the positive voltage connection 32'. This completes the amplifier circuit between the transformer T1 and T2.

As shown in FIG. 7, the point X between the one side of the transformer primary T2 is connected to the base of the transistor Q6 after passing through rearranged CR4 diode. As the voltage at point X becomes less, due to the IR drop of resistor R20, the transistor Q6 will conduct and its emitter will pass current through resistor R15 and diode CR5 to the base of Q7 which when it fires it puts a bias through C6 places a pulse on the base of Q8 preventing it from conducting current. Thus Q7 and Q8 form a multiple vibrator providing equal on and off pulses to operate the radiator 31 causing the same to provide a pulsating radiations against the sensor S1 in the manner similar to that of the pulsating relay P in the previous diagrams of FIGS. 5 and 6.

When Q1 conducts its current is amplified by Q3 and Q4 and the collector of Q4 flows through the primary winding of T2 and through the resistor R20 to the DC voltage source. The circuit is fundamentally a multivibrator which ordinarily give equal on-off pulses. By substituting Q6 with its associated R15 and its base bias voltage divider R13 and R14 for a simple fixed resistor such as R18, the turn on time of Q7 can be varied in accordance with the voltage developed across R20. The object is to compensate for variations in sensitivity of the amplifier and also the lamp characteristics so that the DC pulses applied to the primary of transformer T2 are "on" half of the time and "off" half the time. When this condition exists, about one-half of the 20 volts is consumed by R20 so that point X is about 8 to 10 volts less than 20; or in other words, it moves 8 to 10 volts in the negative direction. When this happens, the base voltage of Q6 is moved in the negative direction, its conductivity is reduced, and R15 together with Q6 assumes the character of a higher resistance, and the "turn on" time of Q7 is delayed. The "turn off" time remains constant as determined by C6 and R18, so the net result is to shorten the duration of each pulse of current flowing through lamp 31. Hence, in spite of the fact that the lamp filament is heated quicker than it cools down, by shortening the pulse that heats the lamp filament as the voltage drop across R20 increases, equal or nearly so "on" and "off" surges of current are maintained through the primary of transformers T2. This is desirable so as to have a nearly perfect square wave applied to transistors Q9 and Q10 and also applied by them to the primary of transformer T1 to operate all parts at maximum efficiency. The bias voltage produced by R13 and R14 controls Q6 until the negative going voltage of R20 exceeds the preset value.

Checking the operation of the whole unit to insure it is ready to detect the signal from another crane is accomplished by placing an infrared radiator, such as, for example, a small lamp bulb, semiconductor radiator, (but it will not sense fluorescent lighting) inside the housing where it is protected, and locating it where it is able to energize the sensor head but not obstruct radiation coming in from the outside. By applying pulsing current to this member or lamp the filament heats and cools and the resulting pluses of infrared radiation excites the sensor S1, pulsing DC current is amplified and passes through the primary of transformer T2, AC current from the secondary of this transformer is amplified further by Q11, Q12, Q9, and Q10, and passes through the transformer T1, the full wave bridge rectifier and energizes the relay RL. As long as the relay is energized, the contacts are in a position so that the horn or other warning device is silent, and the electrical circuit through RL front contact RLF that allows the crane to operate is complete.

Since the lamp filament cannot be expected to cool down completely during its deenergized period, and since the sensitivity of the sensing head and the following amplifying equipment cannot be expected to always be the same, the amount of energy to be delivered to the lamp must be carefully regulated. If too much or too little excitation is provided by the lamp driver, the AC applied to the amplifier will not be correct for proper operation.

The lamp driver is a conventional multivibrator circuit except that instead of having a 5.1 K fixed resistor connected between CR5 and the +20 volt source, a variable resistance network consisting of Q6, R15, R13 and R14 and C4 substituted. The base of Q6 is connected to point X, and the lamp is in series with Q7. Whereas Q8 always turns on in a predetermined length of time as determined by C6 and R18, Q7 turns on sooner or later in accordance with the resistance made up of Q6 and R15 which is to Q7 what R18 is to Q8. Hence the duration of the pulse of current flowing through the lamp may be longer or shorter depending on the condition of Q6.

The DC pulses that are produced by the heating and cooling of the lamp filament, after detection by the sensing element S1 and after amplification cause a voltage drop to appear at point X because of the current flowing through the resistor R20. With increasing current the IR drop causes the voltage at point X to move in the negative direction. This voltage is applied to the emitter of Q6, and causes it to conduct less current as the voltage drop through the resistor increases. This causes more delay in its turn on time, and thereby shortens the relative length of time the lamp is energized. Hence the length of pulses flowing through the lamp decreases as the current through the resistor R20 increases, and maintains it at the optimum point.

When radiation from the outside strikes the sensor S1, transistor Q4 saturates completely, there is no AC to drive Q9 and Q10 and the relay drops, thereby warning the crane operators or stopping the cranes.

As mentioned earlier, when the cranes approach each other, the heating element comes into view of the sensing head, and as they continue to approach, passes out of view again. Depending on the angle of the sensing head and the speed of the cranes this may take about 2 seconds. If it is desirable for the warning time to be extended, this can be easily accomplished by increasing the size of capacitor C4 in the lamp driver circuit. When the transistor Q4 saturates, the voltage applied to the base of Q6 in the lamp driver circuit causes the lamp driver to stop altogether, and if C4 is large enough, it would restart only after many seconds of delay. This would insure ample time to stop the cranes.

I claim:

1. A fail-safe radiation detector and control sensor to register a signal of the proximity between relatively movable objects each having means to project a radiating signal comprising a radiation detector means having a defined field of view and mounted on one of such objects to receive and respond to said radiating signal from the other object when they are within a preselected range distance of each other, a first and second enclosed sensing element respectively connected in series between a positive voltage and ground to provide a lower positive voltage at their juncture, only said first sensor element positioned to receive said radiation signal, an NPN transistor having its base connected to said juncture and its collector and emitter each connected through a resistor respectively to said positive voltage and to ground, a second NPN transistor having its base connected to a voltage divider between said positive voltage and ground and its collector through a resistor to said positive voltage and its emitter to the emitter of said first transistor to apply bias for the latter, a third PNP transistor having its base connected to the collector of said first transistor and its emitter to said positive voltage and its collector through two resistors to ground, a fourth transistor having its base connected between said two resistors and its emitter connected to ground and its collector to one end of a DC relay the other end of which is connected to said positive voltage, a first contact heel of said DC relay connected to a condenser the other side of which is connected to ground and its front contact connected to said positive voltage and its back contact connected to a signal relay the other side of which is connected to ground, a time delay in opening condenser connected across said signal relay, a radiating signal means enclosed with said exposed sensor element and having one end connected to positive voltage and the other filament end connected to a second back contact of said DC relay the second heel of which is connected to ground.

2. A fail-safe radiation detector and control sensor to register a signal of the proximity between relatively movable objects each having means to project a radiating signal comprising a radiation detector means having a defined field of view and mounted on one of such objects to receive and respond to said radiating signal from the other object when they are within a preselected range distance of each other, a first and second enclosed sensing element respectively connected in series between a positive voltage and ground to provide a lower positive voltage at their juncture, only said first sensor element positioned to receive said radiation signal, an NPN transistor having its base connected to said juncture and its collector and emitter each connected through a first and second resistor respectively to said positive voltage and to ground, a second NPN transistor having its base connected to a voltage divider between said positive voltage and ground and its collector through a resistor to said positive voltage and its emitter to the emitter of said first transistor to apply bias for the latter, a third PNP transistor having its base connected to the collector of said first transistor and its emitter to said positive voltage and its collector through tow resistors to ground, a fourth transistor having its base connected between said two resistors and its emitter connected ground and its collector to one end of a DC relay the other end of which is connected to said positive voltage, a first contact heel of said DC relay connected to ground and its front and back contact connected to the opposite ends of a primary transformer the center tap of which is connected to said positive voltage, a secondary of said transformer connected through rectifiers to supply DC to energize a signal relay which functions when deenergized, a radiating signal means enclosed with said exposed sensor element and having one end connected to positive voltage and the other filament end connected to a second back contact of said DC relay the second heel of which is connected to ground.

3. A fail-safe radiation detector and control sensor to register a signal of the proximity between relatively movable objects each having means to project a radiating signal comprising a radiation detector means having a defined field of view and mounted on one of such objects to receive and respond to said radiating signal from the other object when they are within a preselected range distance of each other, a first and second enclosed sensing element respectively connected in series between a positive voltage and ground to provide a lower positive voltage at their juncture, only said first sensor element positioned to receive said radiation signal, an NPN transistor having its base connected to said juncture and its collector and emitter each connected respectively through a first and second resistor to said positive voltage and ground, a second NPN transistor having its base connected to a voltage divider between said positive voltage and ground and its collector connected through a resistor to said positive voltage and its emitter to the emitter of said first transistor to apply bias for the latter, a third PNP transistor having its base connected to the collector of said first transistor and its emitter to said positive voltage and its collector through two resistors to ground, a fourth transistor having its base connected between said two resistors and its emitter connected to ground, a condenser connected in parallel with said first resistor, a radiating signal means enclosed with said exposed sensor element and having one end connected to a positive voltage and its other end excited by a controlled pulsating current, a first transformer having its secondary connected through bridge connected rectifiers to supply DC to energize a signal relay, a pair of transistors having their collectors connected to the opposite ends of the primary of said first transformer and their emitters connected through respective resistors to a mid tap of the secondary of a second transformer and to ground and their bases connected respectively to the opposite ends of said second transformer secondary and said second transformer primary having one end connected to the collector of said fourth transistor and its other end to positive voltage.

4. A fail-safe radiation detector and control sensor to register a signal of the proximity between relatively movable objects each having means to project a radiating signal comprising a radiation detector means having a defined field of view and mounted on one of such objects to receive and respond to said radiating signal from the other object when they are within a preselected range distance of each other, a first and second enclosed sensing element respectively connected in series between a positive voltage and ground to provide a lower positive voltage at their juncture, only said first sensor element positioned to receive said radiation signal, an NPN transistor having its base connected to said juncture and its collector and emitter each connected respectively through a first and second resistor to said positive voltage and ground, a second NPN transistor having its base connected to a voltage divider between said positive voltage and ground and its collector connected through a resistor to said positive voltage and its emitter to the emitter of said first transistor to apply bias for the latter, a third PNP transistor having its base connected to the collector of said first transistor and its emitter to said positive voltage and its collector through two resistors to ground, a fourth transistor having its base connected between said two resistors and its emitter connected to ground, a condenser connected in parallel with said first resistor, a radiating signal means enclosed with said exposed sensor element and excited by a controlled pulsating current, a first transformer having its secondary connected through rectifiers to supply DC to energize a signal relay, a pair of transistors having their collectors connected to the opposite ends of the primary of said first transformer and their emitters connected through respective resistors to a mid tap of the secondary of a second transformer and to ground and their bases connected respectively to the emitters of two amplifying transistors the emitters of each being also connected through a respective resistor to ground and their collectors each being connected through a respective resistor to said positive DC voltage and their bases connected respectively to the opposite ends of said second transformer secondary, said second transformer primary having one end connected to the collector of said fourth transistor and its other end connected through a resistor to positive voltage with a condenser in parallel.

5. The fail-safe radiation detector and control sensor of claim 4 characterized by a multivibrator circuit to supply a controlled pulsating current to energize said radiating signal means and comprising a third pair of transistors with their emitters connected together to ground and the base of one transistor connected through a diode means a condenser and a resistor means to one side of said radiating signal means and the base of the other transistor connected through a diode and resistor to the other side of said radiating signal means, and the collector of said one transistor connected through a condenser and said last diode to the base of said one transistor.

6. The fail-safe radiation detector and control sensor of claim 8 characterized by said controlled pulsating current consisting of a sixth transistor having its collector connected directly to one side of said radiating signal means and its base connected through a resistor to its collector and also connected through a diode to said other end of said primary winding of said second transformer and its emitter connected through a resistor to a diode of a first base of a third pair of transistors and a connection from said sixth transistor base through a resistor and condenser in parallel to ground and the collectors of said third pair to transistors which function as a multivibrator circuit to supply said radiating signal means.

7. The fail-safe radiation detector and control sensor of claim 4 characterized by said controlled pulsating current consisting of a sixth transistor having its collector connected directly to said other side of said radiating signal means and its base connected through a resistor to its collector and also connected through a diode to said other end of said primary winding of said second transformer and its emitter connected through a resistor to said diode means of the base of said third pair of transistors and a connection from said sixth transistor base through a resistor and condenser in parallel to ground and to the collectors of said third pair of transistors.

8. The fail-safe radiation detector and control sensor of claim 5 characterized by said resistor means including a sixth transistor having its collector connected directly to the other side of said radiating signal means and its base connected through a resistor to its collector and also connected through a diode to said other end of said primary winding of said second transformer and its emitter connected through a resistor to said diode of the base of said one of said third pair of transistors and a connection from said sixth transistor base through a resistor and a condenser in parallel to ground and the collectors of said third pair of transistors.

9. A fail-safe radiation detector and control sensor to register a signal of the proximity between relatively movable objects each having means to project a radiating signal comprising a radiation detector means having a defined field of view and mounted on one of such objects to receive and respond to said radiating signal from the other object when they are within a preselected range distance of each other, a pulsating radiating signal means effective on a sensor of a mobile object, a tubular housing pivotally mounted to be positioned at a preselected angle, first and second sensors enclosed in said housing and connected in series between positive voltage and ground to provide a lower positive voltage at their juncture, a partition in said housing having a vertical rectangular aperture to expose said first sensor to said radiation signal means from one end of said housing and said second sensor enclosed and subjected to the same ambient temperature to balance against each other so that their sensitivity remains constant over a wide range of temperature, a base of a first transistor connected to said sensor juncture, a voltage divider to apply voltage to the base of a second transistor, their respective collectors connected through their respective first and second resistors to positive voltage with a first condenser paralleling said first resistor and their emitters of said first and second transistors connected together and through a third resistor to ground to preset the bias voltage on the emitter of said first transistor to determine the point at which it conducts, a third transistor having its base connected to the collector of said first transistor and its emitter to positive voltage while its collector is connected through one end of the seventh and eighth resistors in series to ground, and a fourth transistor having its base connected to the juncture of said seventh and eighth resistors with its emitter to ground and its collector to pulse said radiation signal means effective on said first sensor.

UNITED STATES PATENT OFFICE
CERTIFICATE OF CORRECTION

Patent No. 3,582,933          Dated  June 1, 1971

Inventor(s)   Willard Porter Place

It is certified that error appears in the above-identified patent and that said Letters Patent are hereby corrected as shown below:

Column 10, line 27, claim reference numeral "8" should read -- 3 --.

Signed and sealed this 7th day of December 1971.

(SEAL)
Attest:

EDWARD M. FLETCHER, JR.         ROBERT GOTTSCHALK
Attesting Officer               Acting Commissioner of Patents